United States Patent [19]
Murakoshi et al.

[11] Patent Number: 6,059,434
[45] Date of Patent: May 9, 2000

[54] PLASTIC LENS FOR VEHICLE LIGHT ASSEMBLY AND METHOD OF MANUFACTURING THE SAME

[75] Inventors: Mamoru Murakoshi; Hirokazu Isokawa, both of Shizuoka, Japan

[73] Assignee: Koito Manufacturing Co., Ltd., Tokyo, Japan

[21] Appl. No.: 08/985,202

[22] Filed: Dec. 4, 1997

[30] Foreign Application Priority Data

Dec. 4, 1996 [JP] Japan ................................. 8-337724
Dec. 4, 1996 [JP] Japan ................................. 8-337725

[51] Int. Cl.[7] ....................................................... B60Q 1/00
[52] U.S. Cl. .......................... 362/510; 362/460; 362/162; 428/451
[58] Field of Search ................................... 362/459, 460, 362/510; 428/451; 427/162

[56] References Cited

U.S. PATENT DOCUMENTS

| | | | |
|---|---|---|---|
| 4,342,074 | 7/1982 | Bull et al. | 362/80 |
| 4,669,035 | 5/1987 | Hyde et al. | 362/326 |
| 5,001,610 | 3/1991 | Otaka | 362/61 |
| 5,096,626 | 3/1992 | Takamizawa et al. | 264/1.7 |
| 5,319,007 | 6/1994 | Bright | 523/516 |
| 5,462,806 | 10/1995 | Konishi et al. | 428/451 |
| 5,626,413 | 5/1997 | Ferrell | 362/61 |
| 5,693,366 | 12/1997 | Mase et al. | 427/164 |

*Primary Examiner*—Sandra O'Shea
*Assistant Examiner*—John A. Ward
*Attorney, Agent, or Firm*—Sughrue, Mion, Zinn, Macpeak & Seas, PLLC

[57] ABSTRACT

A vehicle light assembly includes: a lamp body having a mounting groove; and a plastic lens having a fitting part to be fitted into the mounting groove of the lamp body; and a flange portion protruding outwardly on a fore side of the fitting part; and a hard coat film formed over the outer surface of the lens except the rear face of the flange portion and the fitting part.

12 Claims, 6 Drawing Sheets

PLASTIC LENS FOR VEHICLE LIGHT ASSEMBLY AND METHOD OF MANUFACTURING THE SAME

BACKGROUND OF INVENTION

The prevent invention relates to a plastic lens and a method of manufacturing the same. More particularly, the invention relates to a technique to prevent a hard coat film from attaching to a fitting part of a plastic lens to be fit to a lamp body in a vehicle light assembly.

A plastic lens is superior to a glass lens in that its weight is light, its impact resistance is high and hard to be damaged, a freedom of configuration of design, a sharp lens cut formation is easy, and hence, a light distribution performance is improved, and so on. The plastic lens having such advantages are suitable for the lens of the vehicle light or lamp which must be light in weight, high in impact resistance, and is required to control light distribution.

The plastic lens is disadvantageous in that the wear resistance properties are poor, the weathering resistance is poor and solvent resistance is poor. Poor wear resistance leads to easy damaging of the lens, poor weathering resistance leads to deterioration of the lens by sun rays, and poor solvent resistance leads to easy cracking of the lens by the solvent attaching to the lens.

To overcome those disadvantages of the plastic lens, a hard coat film, which absorbs ultraviolet rays, is formed on the surface of the plastic lens.

Figure 4:
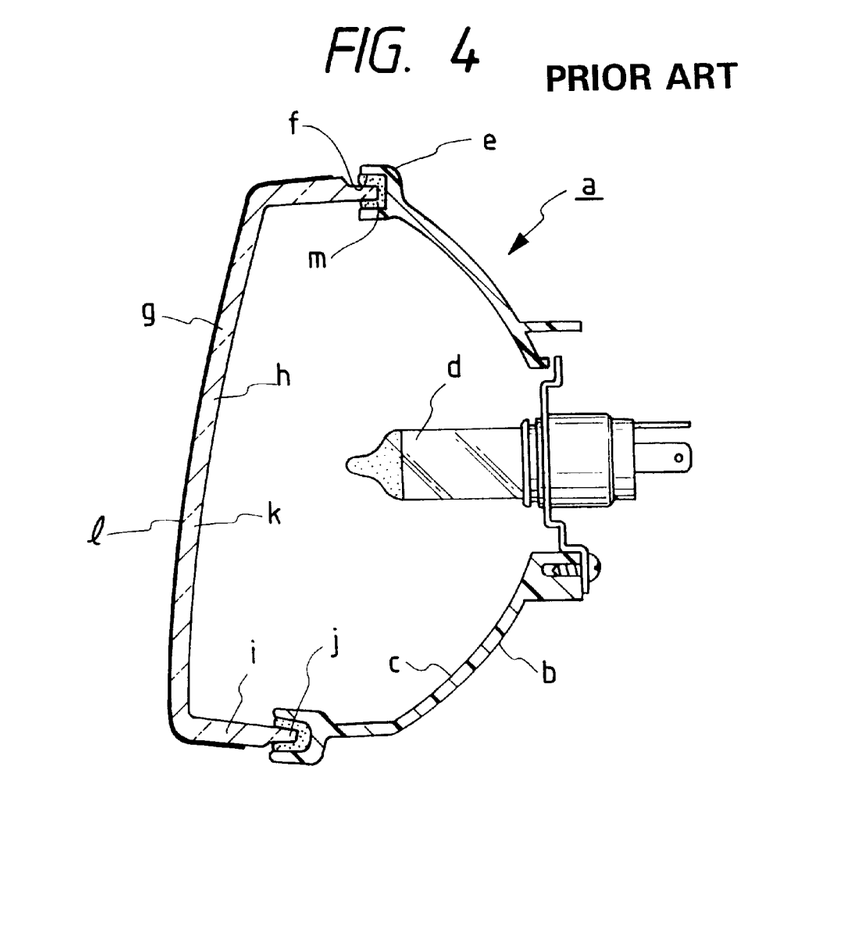
FIG. 4 is a longitudinal sectional view showing a conventional vehicle light assembly.

An example of a vehicle light assembly having the plastic lens with the hard coat Elm is shown in FIG. 4.

A lamp body b includes a concavity c opened to the front. A bulb d is supported by the central part of the rear wall of the lamp body. A mounting edge e projected outward is formed on and along the edge of the opening of the lamp body b. A mounting groove f, opened to the front, is formed on and along the mounting edge e.

A front lens g consists of a front portion h dimensioned so as to cover the front opening of the lamp body b and a side portion i protruding substantially rearwardly of the circumferential edge of the front portion h. A rear end j of the side portion i of the front lens g serves as a fitting part. A substrate k of the front lens g is made of transparent synthetic resin, e.g., polycabonate, methacrylate, or the like. A hard coat film l containing ultraviolet rays absorbent is formed over the outer surface of the substrate k except the fitting part j.

The front lens g is mounted on the lamp body b in a manner that the fitting part j is fit into the mounting groove f of the lamp body b with sealing material m, e.g., hot melt, intervening therebetween.

The hard coat film l is formed over the plastic lens in the following manner. The outer surface of the lens substrate k of the lens is coated with resin composition of the ultraviolet rays curing type by, for example, a spray coating method or a dipping method. The resin composition coated on the lens substrate is exposed to ultraviolet rays to be cured into a hard coat film l.

If the hard coat film is adhered to the fitting part j, the bonding strength between the fitting part and the sealing material m is lowered.

Figure 5:
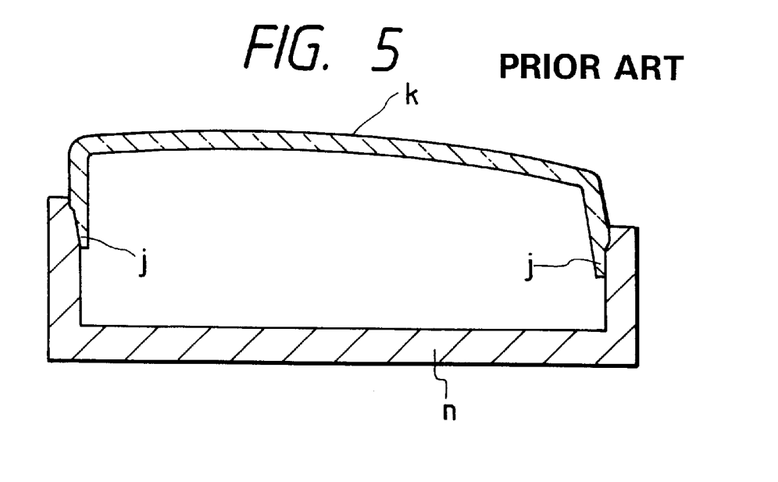
FIG. 5 is a sectional view showing a state that a masking tool is applied to a lens substrate of the conventional vehicle light assembly.

The fitting part j of the lens substrate k is masked with a masking tool n as shown in FIG. 5. In this state, the lens substrate k is coated with the resin composition by a spray coating method or a dipping method. With the masking, the hard coat film l is not attached to the fitting part j. This method has the following disadvantages. It takes a number of film forming steps. If the masking tool n is poor in precision, the resin composition flows into the fitting part j through a gap between the lens substrate and the masking tool n. To avoid this, an expensive masking tool n must be used. If a high precision masking tool n is used, it frequently damages the fitting part j when the masking tool n is attached to the lens substrate. Furthermore, in this case, the resin composition frequently flows to the fitting part j when the masking tool n is removed after the coating process.

In the conventional plastic lens and the conventional method of forming a hard coat film on the surface thereof, the solvent evaporation performed before the resin composition is cured by ultraviolet rays is insufficient. Some amount of solvent is left in the resin composition. This residual solvent gives rise to fogging, blushing, and cracking of the hard coat film.

SUMMARY OF INVENTION

Accordingly, an object of the present invention is to reliably prevent the resin composition from attaching to the fitting part in an inexpensive manner.

Another object of the present invention is to form a quality hard coat film on the surface of the plastic lens without the peeling-off of the hard coat film, blushing of the same, and other defects.

According to a first aspect of the invention, there is provided a vehicle light assembly having a plastic lens with a hard coat film formed on the surface thereof, wherein the lens includes a fitting part to be fitted into a mounting groove of a lamp body, and a flange portion protruding outwardly on the fore side of the fitting part, and the hard coat film is formed over the outer surface of the lens except the rear face of the flange portion and the fitting part.

In the thus constructed vehicle light assembly, the flange portion serves as a partition when the lens is coated with a hard coating liquid. With this feature, a simple tool, which has a wall on which the rear face of the flange portion, may be used for the coating of the lens with the hard coating liquid. It is possible to reliably prevent the hard coating liquid or the hard coat film from attaching to the flange portion. The structural requirement for the tool is only to reliably receive the rear face for the flange portion. There is no need of manufacturing the coating tool with high precision. This leads to cost reduction, and eliminates a danger of damaging the fitting part when the lens substrate is placed on the coating tool. Further, there is no chance that the hard coating liquid flows to the fitting part since the flange portion 11 blocks the flowing of the hard coating liquid to the fitting part.

According to a second aspect of the invention, there is provided a method of manufacturing a vehicle light assembly, wherein the lens substrate is coated with a hard coating liquid in a state that the flange portion is put on the upper end of a wall of a coating tool with the wall surrounding the outer surface of the fitting part of the lens, and the hard coating liquid is cured to form a hard coat film over the outer surface of the lens substrate except the rear face of the flange portion and the fitting part.

This manufacturing method can readily and reliably manufacture the plastic lens in which a hard coat film is not attached to the fitting part of the lens.

According to a third aspect of the invention, there is provided a plastic lens, wherein the surface of the substrate of the plastic lens includes a fitting part to be fitted into a mounting groove of a lamp body when the lens substrate is mounted on the lamp body, and a flange portion protruding outwardly on the fore side of the fitting part, is cleaned, the lens substrate is coated with a hard coating liquid in a state that the flange portion is put on the upper end of a wall of a coating tool with the wall surrounding the outer surface of the fitting part, the hard coating liquid contains resin composition of the ultraviolet rays curing type and solvent, the lens substrate coated with the hard coating liquid is put in a furnace where the lens substrate is heated to evaporate the solvent from the hard coating liquid, and the lens substrate is put in an ultraviolet irradiating device to cure the resin composition by irradiating the lens substrate with ultraviolet rays, whereby a hard coat film is formed on the portion of the outer surface of the lens substrate except the fitting part thereof.

The plastic lens thus constructed is free from the peeling-off, blushing, and cracking of the hard coat film. No hard coat film is attached to the fitting part. Therefore, when the plastic lens is fit into and bonded to the mounting groove of the lamp body with sealing material intervening therebetween, it never happens that the hard coat film attached to the fitting part lowers the bonding strength of the adhesion.

According to a fourth aspect of the invention, there is provided a method of forming a hard coat film on a plastic lens which comprises the steps of: cleaning the surface of the substrate of the plastic lens; coating the surface of the lens substrate with a hard coating liquid containing resin composition of the ultraviolet rays curing type and solvent; putting the lens substrate coated with the hard coating liquid in a furnace where the lens substrate is heated to evaporate the solvent from the hard coating liquid; and putting the lens substrate in an ultraviolet irradiating device to cure the resin composition by irradiating the lens substrate with ultraviolet rays, whereby a hard coat film is formed on the portion of the outer surface of the lens substrate.

The hard coat film forming method of the invention, the step of heating the hard coating liquid to evaporate the solvent form the hard coating liquid is executed before the ultraviolet rays irradiating step. The solvent is satisfactorily evaporated, so that the plastic lens is free from the problems arising from the solvent contained in the hard coat film, e.g., fogging, blushing and cracking of the plastic lens.

DETAILED DESCRIPTION OF PREFERRED EMBODIMENTS

A vehicle light assembly and a method of manufacturing the same, which are embodiments of the present invention, will be described with reference to the accompanying drawings.

Figure 1:
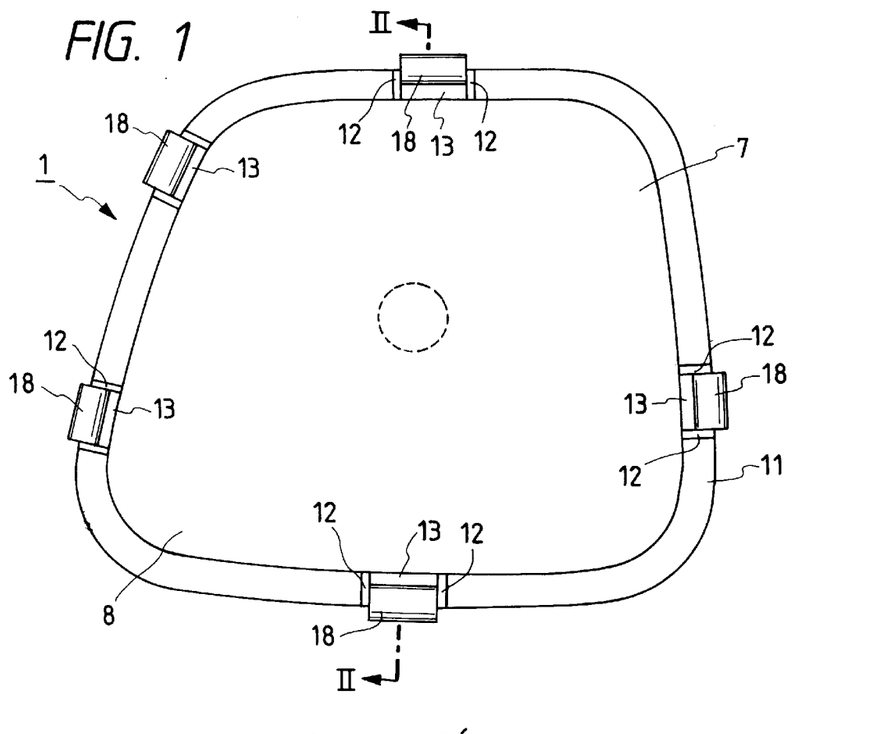
FIG. 1 is a front view showing a vehicle light assembly according to the present invention, FIG. 1 cooperating with FIGS. 2 and 3 to show a vehicle light assembly and a method of manufacturing the same, which are embodiments of the present invention.
Figure 2:
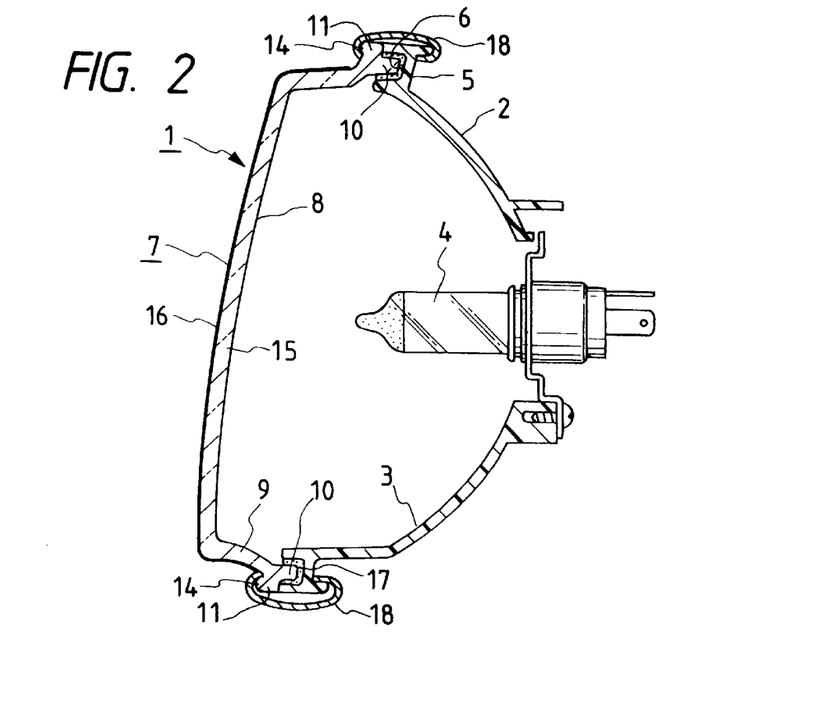
FIG. 2 is a cross sectional view taken on line II in FIG. 1.

A lamp body 2 of a vehicle head light assembly 1 of FIGS. 1–2 includes a concavity 3 being open to the front thereof. A bulb 4 is supported by the central part of the rear wall of the lamp body. A mounting edge 5 projecting outward is formed on and along the edge of the opening of the lamp body 2. A mounting groove 6, being open to the front, is formed on and along the mounting edge 5.

A front lens 7 integratedly comprises a front portion 8 dimensioned so as to cover the front opening of the lamp body 2 and a side portion 9 protruding substantially rearwardly of the circumferential edge of the front portion 8. A rear end 10 of the side portion 9 of the front lens 7 serves as a fitting part. A flange portion 11 protrudes outwardly of the outer surface of the side portion 9 while being located on the fore side of the rear end 10.

A plural number of engaging parts 13 are formed on the front face of the flange portion 11 while being circumferentially spaced from one another. Each engaging part 13 is defined by two protruded liner pieces 12 widthwise extending. Engaging protrusions 14 are provided on the outer edges of the engaging parts 13, respectively.

A substrate 15 of the front lens 7 is made of transparent synthetic resin, e.g., polycabonate, methacrylate, or the like. A hard coat film 16 containing ultraviolet rays absorbent is formed over the outer surface of the substrate 15 except the fitting part 10 and the rear face of the flange portion 11. The thickness of the hard coat film 16 is within the range from 3 to 8 $\mu$m. If it is 3 $\mu$m or thinner, the hard coat film 16 is poor in the resistance-to-wear and weathering resistance. If it is 8 $\mu$m or thicker, its heat resistance is poor, and the hard coat film is fogged or creased.

The hard coat film 16 on the engaging parts 13 is thicker than the remaining portion of the hard coat film. In this case, it is significant to select the thickness thereof to be within 8 $\mu$m.

To mount the front lens 7 on the lamp body 2, the front lens 7 is fitted into the mounting groove 6 of the lamp body 2 with sealing material 17, e.g., hot melt, intervening therebetween. Each clip 18 as a plate spring member bent to be shaped like a C in cross section is resiliently put at one end on the engaging part 13 on the front face of the flange portion 11 of the front lens 7. The other end of the clip 18 is resiliently put on the rear face of the mounting edge 5 of the lamp body 2.

The hard coat film 16 is formed on the substrate 15 of the front lens 7 in the following manner.

The surface of the substrate 15 is cleaned, and a predetermined portion on the outer surface of the substrate 15 whose surface has been cleaned is coated with hard coating liquid.

Figure 3:
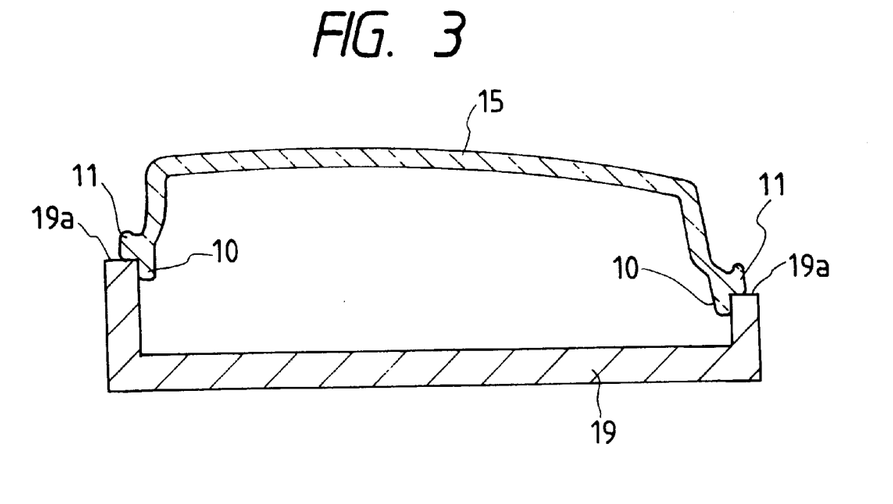
FIG. 3 is a cross sectional view showing a state that a lens substrate is put on a coating tool.

At this time, for example, the coating of the hard coating liquid on the substrate 15 is performed in a state that the substrate 15 is placed on a coating tool 19 shown in FIG. 3. The coating tool 19 is shaped like a box opened at the top thereof. The edge 19a of the opening of the coating tool 19 corresponds in shape to the rear face of the flange portion 11. When the substrate 15 is put on the coating tool 19, the rear face of the flange portion 11 is brought into contact with the edge 19a of the coating tool 19 while being exactly aligned with each other. A portion on the outer surface of the substrate 15, except the fitting part 10 and the rear face of the flange portion 11, is coated with the hard coating liquid by a spray coating method in a state that the substrate 15 is located on the coating tool 19.

The hard coating liquid contains an ultraviolet curing resin composition and solvent. The resin composition may be polyfunctional acrylate (called acrylics), silicone or the like.

The substrate 15 having been coated with the hard coating liquid is placed in a furnace (not shown). In the furnace, the hard coating liquid is heated and the solvent contained therein is evaporated.

Thus, the furnace heats the hard coating liquid to evaporate the solvent therefrom, and the resin composition is left on the surface of the substrate 15. Then, the substrate 15 is placed in an ultraviolet irradiating device. In the furnace, it is exposed to ultraviolet radiation, so that the resin composition in the hard coating liquid is cured to form a hard coat film 16 thereon.

As described above, in the process of forming a hard coat film 16 on the substrate 15 of the front lens 7 of the vehicle head light assembly 1, the substrate 15 is coated with hard coat liquid in a state that the substrate 15 is placed on the coating tool 19. With this unique feature, there is no chance that the hard coating liquid adheres to the fitting part 10, and that the hard coating liquid flows to the fitting part 10 since the flange portion 11 blocks the flowing of the hard coating liquid to the fitting part 10. In this respect, the present invention succeeds in solving the problem arising from the fact that the hard coat film 16 adheres to the fitting part 10, viz., the lowering of the bonding strength between the fitting part 10 and the sealing material 17. Because of the barrier function of the flange portion 11, there is no need of tightly fitting of the fitting part 10 to the coating tool 19. In other words, it is only needed that the flange portion 11 of the substrate 15 is merely put on the edge 19a of the coating tool 19. There is no need of manufacturing the coating tool 19 with high precision. This leads to cost reduction, and eliminates a danger of damaging the substrate 15, more exactly the fitting part 10 thereof.

Another embodiment of the present invention will be described with reference to the accompanying drawings.

Figure 6:
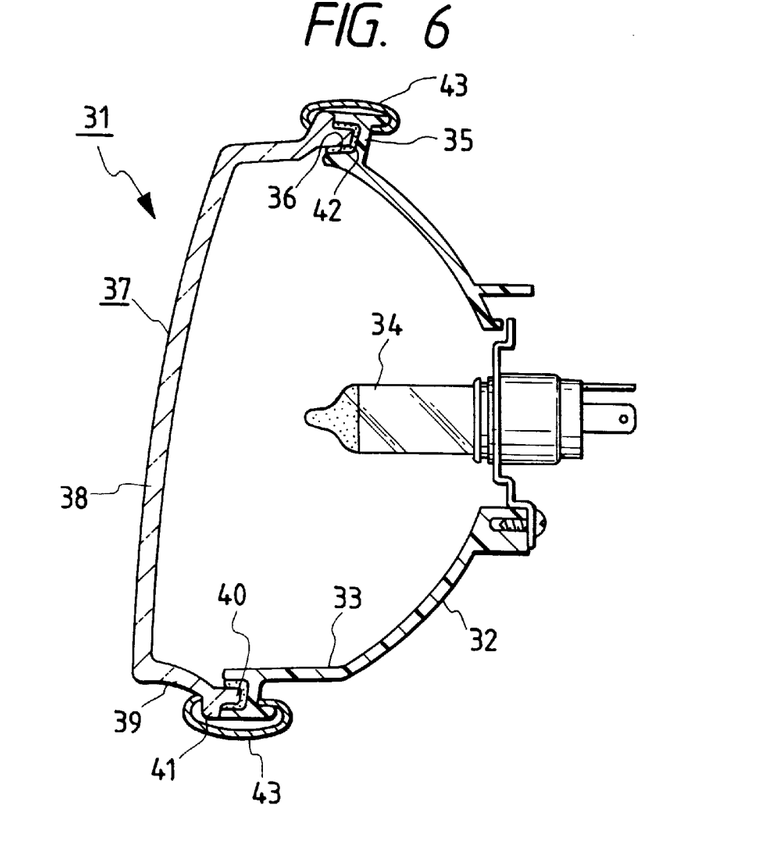
FIG. 6 is a cross sectional view showing a vehicle light assembly using a plastic lens on which a hard coat film is to be formed according to an embodiment of the present invention.

A plastic lens of the invention is as shown in FIG. 6, for example.

In the figure, a vehicle head light assembly 31 is shown. A lamp body 32 includes a concavity 33 opened to the front. A bulb 34 is supported by the central part of the rear wall of the lamp body. A mounting edge 35 projecting outward is formed on and along the edge of the opening of the lamp body 32. A mounting groove 36, being open to the front, is formed on and along the mounting edge 35.

A front lens 37 consists of a front surface 38 so dimensioned as to cover the front opening of the lamp body 32 and a side portion 39 protruding substantially rearwardly of the circumferential edge of the front surface 38. A rear end 40 of the side portion 39 serves as a fitting part. A flange portion 41 protrudes outwardly of the outer surface of the side portion 39 while being located on the fore side of the rear end 40. A substrate of the front lens 37 is made of transparent synthetic resin, e.g., polycabonate, methacrylate, or the like. A hard coat film containing ultraviolet rays absorbent is formed over the outer surface of the substrate except the fitting part 40 and the rear face of the flange portion 41.

To mount the front lens 37 on the lamp body 32, the front lens 37 is fit into the mounting groove 36 of the lamp body 32 with sealing material 42, e.g., hot melt. Each clip 43 as a plate spring member bent to be shaped like a C in cross section is resiliently put at one end on the front face of the flange portion 41 of the front lens 37. The other end of the clip 43 is resiliently put on the rear face of the mounting edge 35 of the lamp body 32.

A method for forming a hard coat on the substrate of the lamp body 32 will be described.

Figure 8:
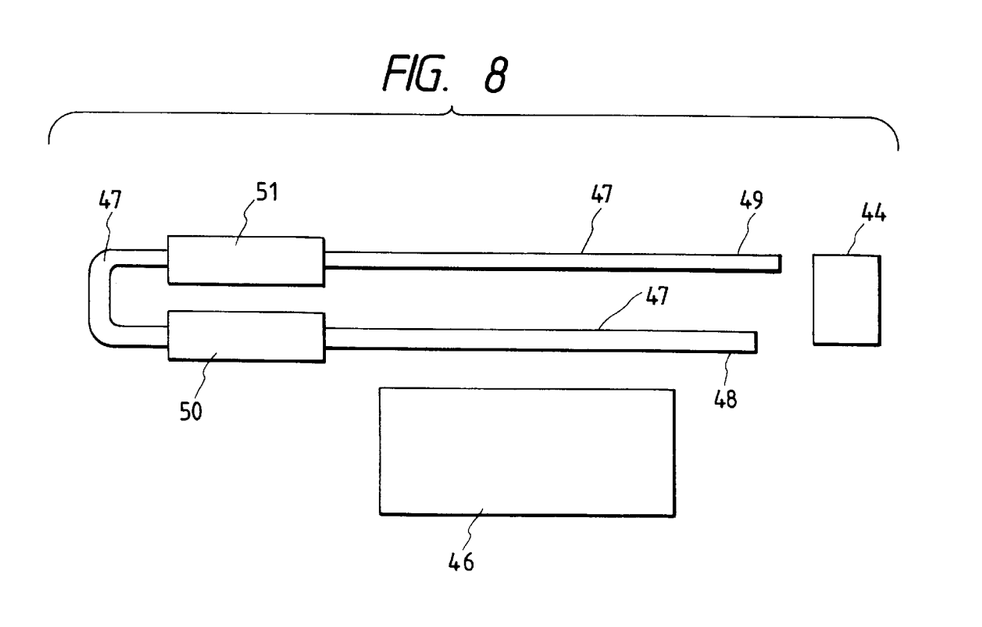
FIG. 8 is a diagram showing a system for forming a hard coat film on the plastic lens according to the embodiment of the invention.

FIG. 8 is a diagram showing a system for forming a hard coat film on the substrate of the front lens 37, according to an embodiment of the present invention.

In the figure, a cleaning device 44 is provided for cleaning the surface of the substrate 45. A coating device 46 is disposed adjacent to the cleaning device 44. After the surface of the substrate 45 is cleaned by the cleaning device 44, the substrate 45 is moved to the coating device 46. The coating device 46 coats the surface of the substrate 45 with hard coating liquid.

A conveyor 47 includes a take-in portion 48 and a take-out portion 49. Those portions are located adjacent to the coating device 46. The lens substrate 45 is put on the conveyor 47 at the take-in portion 48, and is conveyed through a predetermined transporting route and arrives at the take-out portion 49. At this portion, the lens substrate 45 is taken out.

The lens substrate 45, conveyed by the conveyor 47, first reaches a furnace 50 and then an ultraviolet irradiating device 51, and finally the take-out portion 49.

The lens substrate 45 is first cleaned by the cleaning device 44. For cleaning the surface of the lens substrate 45, the cleaning device 44 employs the combination of an electrostatic removal method and an air blowing method.

The lens substrate 45 of which the surface has been cleaned by the cleaning device 44 is conveyed to the coating device 46 where a predetermined portion on the surface of the lens substrate 45 is coated with hard coating liquid.

Figure 7:
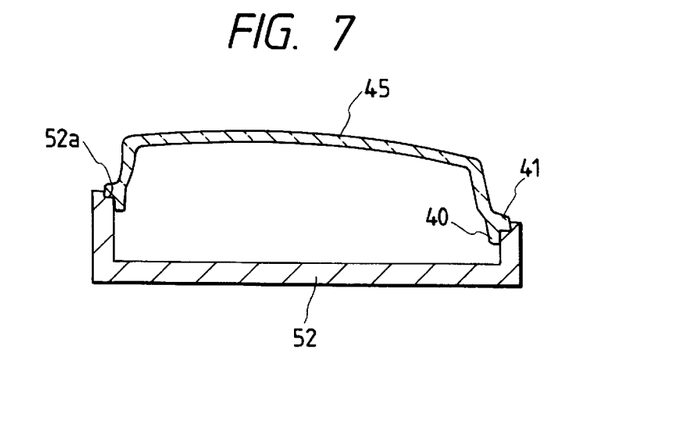
FIG. 7 is a cross sectional view showing a state that a lens substrate is put on a coating tool according to the embodiment of the invention.

At this time, for example, the coating of the hard coating liquid on the substrate 45 is performed in a state that the substrate 45 is placed on a coating tool 52 shown in FIG. 7. The coating tool 52 is shaped like a box opened at the top thereof. The edge 52a of the opening of the coating tool 52 corresponds in shape to the rear face of the flange portion 41. When the substrate 45 is put on the coating tool 52, the rear face of the flange portion 41 is brought into contact with the edge 52a of the coating tool 52 while being exactly aligned with each other. A portion on the outer surface of the substrate 45, except the fitting part 40 and the rear face of the flange portion 41, is coated with the hard coating liquid by a spray coating method in a state that the substrate 45 is located on the coating tool 52.

The hard coating liquid contains an ultraviolet curing resin composition and solvent. The resin composition may be polyfunctional acrylate (called acrylics), silicone or the like.

The lens substrate 45 coated with the hard coating liquid is put on the conveyor 47 at the take-in portion 48, and conveyed by the conveyor 47, and passes through the furnace 50. When moving through the furnace 50, the solvent is evaporated from the hard coating liquid.

The furnace 50 is of the infrared rays (IR) type, for example, and takes a shape of a tunnel through which the conveyor 47 carrying the lens substrate 45 passes. Infrared ray heaters 53u, 53s (see FIG. 9) are arranged within the furnace 50. When the lens substrate 45, conveyed by the conveyor 47, passes through the furnace 50, the solvent is evaporated from the hard coating liquid.

Figure 9:
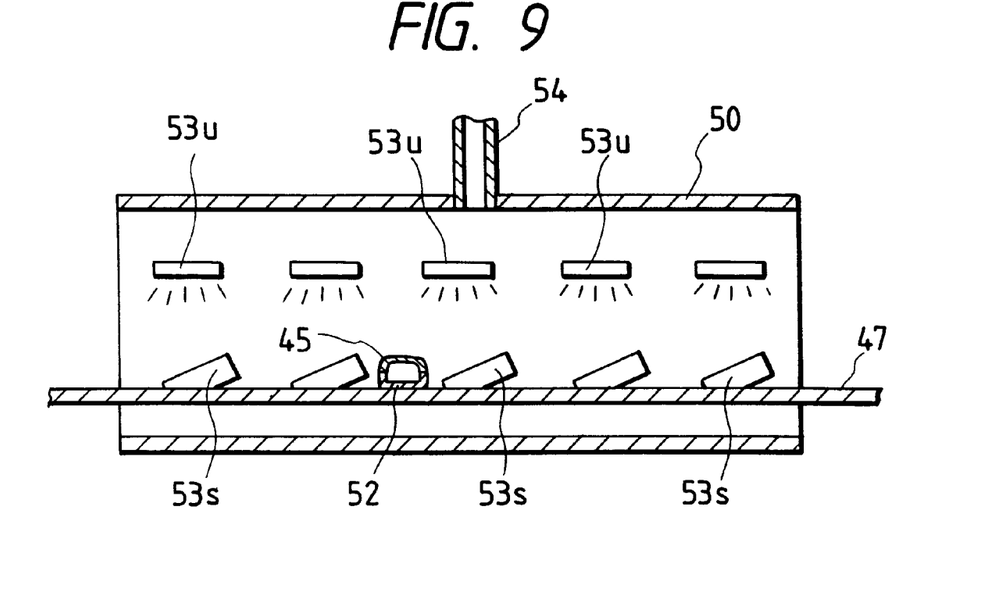
FIG. 9 is a longitudinal sectional view showing a furnace according to the embodiment of the invention, FIGS. 9 and 10 cooperating to show an outline of the furnace.
Figure 10:
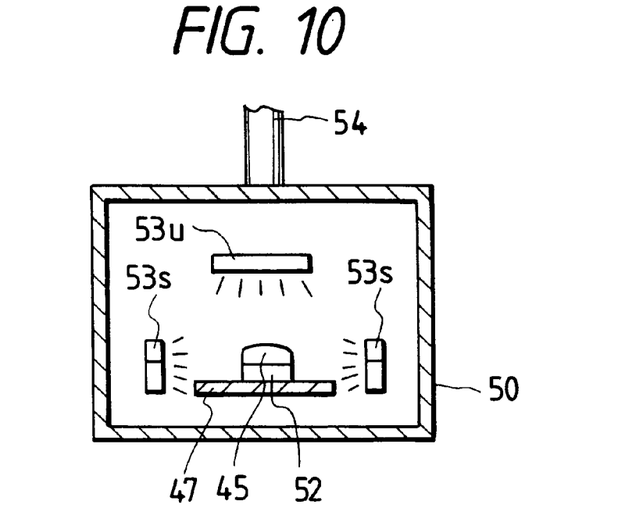
FIG. 10 is a cross sectional view showing the furnace.

The infrared ray heaters 53u, 53s are arranged so that the surface of the lens substrate 45 is uniformly irradiated with the infrared ray heaters 53u, 53. The arrangement of the infrared ray heaters 53 follows.

Where the lens substrate 45 is conveyed in a state that it is put on the conveyor 47 with the front surface 38 of the lens substrate 45 being turned upward, infrared ray heaters 53u are arrayed on the upper inner surface of the furnace 50. Those infrared ray heaters 53u are provided for heating the top side of the lens substrate 45. Infrared ray heaters 53s are arrayed on the inner side walls of the furnace 50. Those infrared ray heaters 53s are provided for heating both sides of the lens substrate 45. Those infrared ray heaters 53u and 53s are slanted with respect to the advancing direction of the lens substrate 45, so that no heat spots are formed on the sides of the lens substrate 45, which are confronted with the infrared ray heaters.

An exhaust duct 54 is connected to the upper side of the furnace 50. The solvent evaporated from the hard coating liquid is constantly exhausted outside through the exhaust duct 54 so as to prevent the solvent from staying within the furnace 50.

The temperature of the infrared ray heaters 53, the distance between the infrared ray heaters 53 and the substrate 45, and a transporting speed of the conveyor 47 are controlled so that the surface temperature of the lens substrate 45 fall within the range of 50° C. to 80° C., when the heating of the substrate progresses in the furnace 50. If the surface temperature of the substrate is below 50° C., the substrate is insufficiently heated, and the solvent is possibly left in the hard coat film. If it exceeds 80° C., the lens substrate 45 is possibly cracked.

Thus, the hard coating liquid is sufficiently heated to completely expel the solvent from the hard coating liquid by use of the furnace. The result is to secure an improved adhesion of the hard coat film to the lens substrate 45, to prevent the hard coat film from being fogged, blushed and cracked.

The lens substrate 45 having a layer of only the resin composition leaves the furnace 50 where it was heated to drive out the solvent from the hard coating liquid, and is conveyed, by the conveyor 47, to enter the ultraviolet irradiating device 51. The lens substrate passes through the ultraviolet irradiating device 51 while being exposed to the ultraviolet rays, so that the resin composition layer is cured, by the ultraviolet rays, into a hard coat film.

The energy of ultraviolet rays applied to the surface of the lens substrate 45, viz., the resin composition, in the ultraviolet irradiating device 51 is preferably within the range of 1,000 to 4,000 mJ/cm$^2$.

If it is less than 1,000 mJ/cm$^2$, the resin composition is not cured. In this case, the hard coat film is sticky and peeled off or it tends to be damaged because of the insufficient curing. Or the hard coat film is made cloudy. If the energy of the ultraviolet rays is in excess of 4,000 mJ/cm$^2$, the hard coat film formed is colored yellow or the lens substrate 45 is cracked, or the weathering resistance of the hard coat film is poor, leading to reduction of its lifetime.

Ultraviolet ray lamps are arrayed on the upper inner wall and both side walls of the ultraviolet irradiating device 51 in order to uniformly irradiate the surface of the lens substrate 45 with ultraviolet rays, like the infrared rays heaters 53 are so arrayed in the furnace 50.

For the measurement of the energy amount of the ultraviolet rays, an amount of ultraviolet rays irradiated on the surface of the lens substrate 45 is measured in an integrating manner, by an ultraviolet ray integrating actinometer (provided by EYE GRAPHIC CO. LTD., for instance), during a period that the lens substrate 45, carried by the conveyor 47, moves through the ultraviolet irradiating device 51. To be more specific, a sensor of the actinometer is set at a position on the conveyor 47, which corresponds to a predetermined position on the lens substrate 45. It is moved though the ultraviolet irradiating device 51. At this time, ultraviolet ray irradiating conditions, such as the light intensities of the ultraviolet rays lamps, distance between the ultraviolet ray lamps and the lens substrate, the irradiating directions of the ultraviolet ray lamps, and transporting speed of the conveyor 47, are adjusted so that an integrated amount of ultraviolet rays takes a predetermined value. This preparatory measurement is carried out for the predetermined positions on the lens substrate 45 to optimize the ultraviolet ray irradiating conditions.

Figure 11:
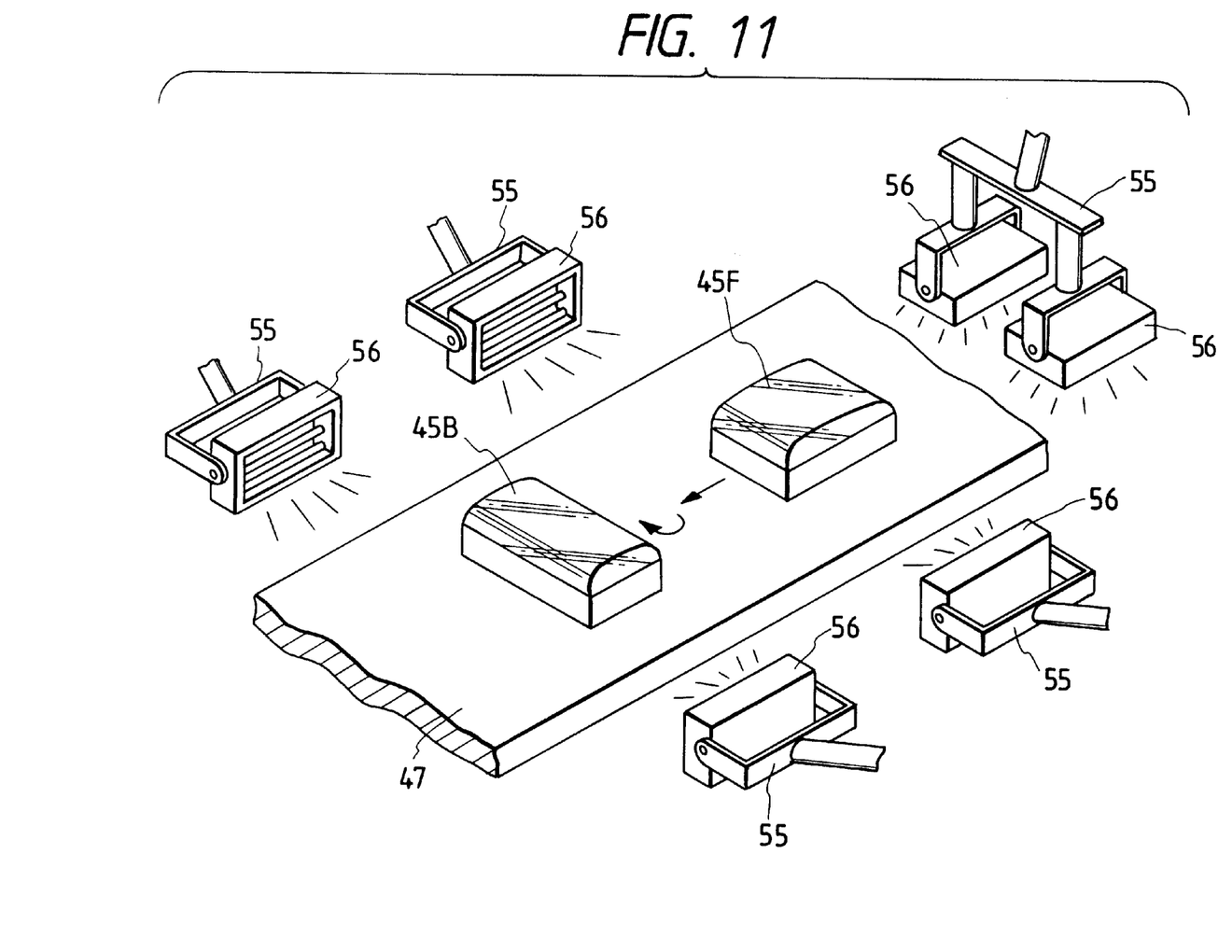
FIG. 11 is a perspective view showing an array of ultraviolet rays lamps within an ultraviolet irradiating device.

To make it easy to set up the ultraviolet rays irradiating conditions, the movable arms 55 of a robot (not shown) are located in the ultraviolet irradiating device 51, and ultraviolet rays lamps 56 are set to the movable arms 55. The irradiating directions of the ultraviolet ray lamps 56 may be changed as desired (FIG. 11).

Preferably, the lens substrate 45 is turned in its orientation so that the ultraviolet rays are applied uniformly over the entire surface of the lens substrate 45, when the lens substrate 45 moves through the ultraviolet irradiating device 51. In the case shown in FIG. 11, the lengthwise direction of the lens substrate 45 (45F in FIG. 11) is coincident with the moving direction of the conveyor 47. In this case, the substrate 45F is turned so that the lengthwise direction of the lens substrate is at a right angle to the moving direction of the conveyor 47 (45B in FIG. 11). Therefore, the longer sides of the lens substrate 45 are first exposed to the ultraviolet rays, and with its movement, the shorter sides of the lens substrate 45 are exposed to the ultraviolet rays.

In this way, the resin composite layered on the surface of the lens substrate 45 is cured by the ultraviolet rays into a hard coat film in the ultraviolet irradiating device 51. The lens substrate 45 having the hard coat film thereon, i.e., a product of a plastic front lens 37 is moved to the take-out portion 49, and picked up.

As described above, according to the present invention, in forming a hard coat film on a plastic lens, a lens substrate is coated with a hard coating liquid, and then is heated to evaporate the solvent from the hard coating liquid. Therefore, no solvent is left in the hard coat film of the lens product. In this respect, the invention succeeds in solving the problems arising from the solvent contained in the hard coat film, e.g., fogging, blushing and cracking of the hard coat film.

Further, in the plastic lens manufactured by the hard coat film forming method of the invention, no hard coat film is attached to the fitting part of the front lens. Therefore, when the plastic lens is fit into the mounting groove of the lamp body with sealing material intervening therebetween, it adapts itself to the sealing material to secure a reliable sealing.

As seen from the foregoing description, in a vehicle light assembly having a plastic lens with a hard coat film formed on the surface thereof, the lens includes a fitting part to be fit into a mounting groove of a lamp body, and a flange portion protruding outwardly on the fore side of the fitting part, and the hard coat film is formed over the outer surface of the lens except the rear face of the flange portion and the fitting part.

In the thus constructed vehicle light assembly, the flange portion serves as a partition when the lens is coated with a hard coating liquid. With this feature, a simple tool, which has a wall on which the rear face of the flange portion, may be used for the coating of the lens with the hard coating liquid. It is possible to reliably prevent the hard coating liquid or the hard coat film from attaching to the flange portion. The structural requirement for the tool is only to reliably receive the rear face of the flange portion. There is no need of manufacturing the coating tool with high precision. This leads to cost reduction, and eliminates a danger of damaging the fitting part when the lens substrate is placed on the coating tool. Further, there is no chance that the hard coating liquid flows to the fitting part since the flange portion 11 blocks the flowing of the hard coating liquid to the fitting part.

Furthermore, the lens is mounted on the lamp body by means of clips, one end of each clip being put on the front face of the flange portion while other end being put on the lamp body, and the hard coat film on the parts on which the clips are put is thicker than the remaining portion of the hard coat film. Since the parts stressed with the clips are reenforced, the flange portion of the lens substrate is hardly damaged.

Still further, the thickness of the hard coat film is within the range of 3 to 8 $\mu$m. This feature optimizes the thickness of the hard coat film.

In a method of manufacturing a vehicle light assembly having a plastic lens with a hard coat film formed on the surface, the substrate of the plastic lens includes a fitting part to be fit into a mounting groove of a lamp body when the lens substrate is mounted on the lamp body, and a flange portion protruding outwardly on the fore side of the fitting part, the lens substrate is coated with a hard coating liquid in a state that the flange portion is put on the upper end of a wall of a coating tool with the wall surrounding the outer surface of the fitting part, and the hard coating liquid is cured to form a hard coat film over the outer surface of the lens substrate except the rear face of the flange portion and the fitting part.

In the manufacturing method, the lens substrate may be coated with the hard coating liquid without any hard coat film attaching to the fitting part in such a simple manner that the lens substrate is put on the coating tool, and is coated with the hard coating liquid. Thus, the method enables one to manufacture a plastic lens of which the fitting part is free from the attachment of the hard coat film thereto.

In a plastic lens constructed according to the present invention, the surface of the substrate of the plastic lens including a fitting part to be fit into a mounting groove of a lamp body when the lens substrate is mounted on the lamp body, and a flange portion protruding outwardly on the fore side of the fitting part, is cleaned, the lens substrate is coated with a hard coating liquid in a state that the flange portion is put on the upper end of a wall of a coating tool with the wall surrounding the outer surface of the fitting part, the hard coating liquid containing resin composition of the ultraviolet rays curing type and solvent, the lens substrate coated with the hard coating liquid is put in a furnace where the lens substrate is heated to evaporate the solvent from the hard coating liquid, and the lens substrate is put in an ultraviolet irradiating device to cure the resin composition by irradiating the lens substrate with ultraviolet rays, whereby a hard coat film is formed on the portion of the outer surface of the lens substrate except the fitting part thereof.

The plastic lens thus constructed is free from the peeling-off, blushing, cracking of the hard coat film. No hard coat film is attached to the fitting part. Therefore, when the plastic lens is fit into the mounting groove of the lamp body with sealing material intervening therebetween, it adapts itself to the sealing material to secure a reliable sealing.

The invention provides a method of forming a hard coat film on a plastic lens which comprises the steps of: cleaning the surface of the substrate of the plastic lens; coating the surface of the lens substrate with a hard coating liquid containing resin composition of the ultraviolet rays curing type and solvent; putting the lens substrate coated with the hard coating liquid in a furnace where the lens substrate is heated to evaporate the solvent from the hard coating liquid; and putting the lens substrate in an ultraviolet irradiating device to cure the resin composition by irradiating the lens substrate with ultraviolet rays, whereby a hard coat film is formed on the portion of the outer surface of the lens substrate.

The hard coat film forming method of the invention, the step of heating the hard coating liquid to evaporate the solvent form the hard coating liquid is executed before the ultraviolet rays irradiating step. The solvent is satisfactorily evaporated, so that the plastic lens is free from the problems arising from the solvent contained in the hard coat film, e.g., fogging, blushing and cracking of the plastic lens.

Still further, the surface temperature of the plastic lens fall within the range of 50° C. to 80° C. Therefore, the solvent is satisfactorily evaporated, so that the plastic lens is free from the problems arising from the solvent contained in the hard coat film, e.g., cracking of the plastic lens.

Still further, the energy of ultraviolet ray in the ultraviolet rays irradiating step is within the range of 1,000 to 4,000 mJ/cm$^2$. Therefore, the plastic lens manufactured by the hard coat film forming method is free from the peeling-off of the hard coat film, poor wear resistance properties, blushing, which arise from the unsatisfactory curing of the resin composition.

Still further, in the heating step, the solvent evaporated into the inside of the furnace is exhausted to remove the staying of the solvent in the furnace. Therefore, there is no chance that the solvent evaporated into the furnace stays within the furnace to hinder an additional evaporation of the solvent.

Still further, the substrate of the plastic lens includes a fitting part to be fit into a mounting groove of a lamp body when the lens substrate is mounted on the lamp body, and a flange portion protruding outwardly on the fore side of the fitting part, and the lens substrate is coated with a hard coating liquid in a state that the flange portion is put on the upper end of a wall of a coating tool with the wall surrounding the outer surface of the fitting part. Therefore, it never happens that the hard coat film is attached to the fitting part.

It should be understood that the specific conditions used in the embodiments description are presented by way of examples, and the invention is not limited by those described conditions in any way.

What is claimed is:

1. A vehicle light assembly comprising:
   a lamp body having a mounting groove; and
   a plastic lens having a flange portion and a fitting part disposed adjacent and rearwardly from said flange portion, said fitting part to be fitted into the mounting groove of the lamp body; and said flange portion being a protruding portion protruding outwardly from said lens; and
   a hard coat film formed over an outer surface of the lens except a rear face of the flange portion and except on the fitting part.

2. The vehicle light assembly according to claim 1, further comprising:
   clips for attaching the plastic lens to the lamp body, wherein one end of each clip attaches to a front face of the flange portion while another end attached to the lamp body, and the hard coat film on the front face of the flange is thicker than a remaining portion of the hard coat film on the plastic lens.

3. The vehicle light assembly according to claim 1 or 2, wherein a thickness of the hard coat film is within range of 3 to 8 μm.

4. A plastic lens obtained by a method comprising the steps of:
   cleaning a surface of a substrate of a plastic lens having a flange portion and a fitting part disposed adjacent and rearwardly from said flange portion, said fitting part to be fitted into a mounting groove of a lamp body when the lens substrate is mounted on the lamp body, with said flange portion being a protruding portion protruding outwardly from said lens;
   coating the lens substrate with a hard coating liquid in a state that the flange portion is placed on an upper end of a wall of a coating tool with the wall surrounding an outer surface of the fitting part, the hard coating liquid containing resin composition of an ultraviolet rays curing type and solvent;
   placing the lens substrate coated with the hard coating liquid in a furnace where the lens substrate is heated to evaporate the solvent from the hard coating liquid; and
   placing the lens substrate in an ultraviolet irradiating device to cure the resin composition by irradiating the lens substrate with ultraviolet rays, so that a hard coat film is formed on a portion of an outer surface of the lens substrate except the fitting part thereof.

5. A method of forming a hard coat film on a plastic lens comprising the steps of:
   cleaning a surface of a substrate of the plastic lens, said lens substrate having a flange portion and a fitting part disposed adjacent and rearwardly from said flange portion, said fitting part to be fitted into a mounting groove of a lamp body when said lens substrate is mounted in the lamp body, and said flange portion which is a protruding portion protruding outwardly from said lens substrate;
   coating the surface of the lens substrate with a hard coating liquid containing resin composition of an ultraviolet rays curing type and solvent;
   placing the lens substrate coated with the hard coating liquid in a furnace;
   heating the lens substrate to evaporate the solvent from the hard coating liquid; and
   placing the lens substrate in an ultraviolet irradiating device to cure the resin composition by irradiating the lens substrate with ultraviolet rays, whereby a hard coat film is formed on a portion of an outer surface of the lens substrate.

6. The method of forming a hard coat film on a plastic lens according to claim 5, wherein in the heating step, a surface temperature of the plastic lens fall within the range of 50° C. to 80° C.

7. The method of forming a hard coat film on a plastic lens according to claim 5 or claim 6, wherein energy of the ultraviolet rays in the ultraviolet rays irradiating step is within the range of 1,000 to 4,000 mJ/cm$^2$.

8. The method of forming a hard coat film on a plastic lens according to any one of claims 5 to 6, wherein in the heating step, the solvent evaporated into an inside of the furnace is exhausted to remove remnants of the solvent in the furnace.

9. The method of forming a hard coat film on a plastic lens according to any one of claims 5 to 6, wherein the flange portion protrudes outwardly on a forward side of the fitting part, and the lens substrate is coated with a hard coating liquid in a state that the flange portion is placed on upper end of a wall of a coating tool with the wall surrounding the outer surface of the fitting part.

10. The method of forming a hard coat film on a plastic lens as claimed in claim 7, wherein in the heating step, the solvent evaporated into a inside of the furnace is exhausted to remove the remnants of the solvent in the furnace.

11. The method of forming a hard coat film on a plastic lens as claimed in claim 7, wherein the flange portion protrudes outwardly on a forward side of the fitting part, and the lens substrate is coated with a hard coating liquid in a state that the flange portion is placed on an upper end of a wall of a coating tool with the wall surrounding an outer surface of the fitting part.

12. The method of forming a hard coat film on a plastic lens as claimed in claim 8, wherein the flange portion protrudes outwardly on a forward side of the fitting part, and the lens substrate is coated with a hard coating liquid in a state that the flange portion is placed on an upper end of a wall of a coating tool with the wall surrounding an outer surface of the fitting part.

* * * * *

UNITED STATES PATENT AND TRADEMARK OFFICE
CERTIFICATE OF CORRECTION

PATENT NO. : 6,059,434
DATED : May 9, 2000
INVENTOR(S) : Mamoru Murakoshi, Hirokazu Isogawa It is certified that error appears in the above-identified patent and that said Letters Patent is hereby corrected as shown below:

On the Title page:

Item [73] delete "Hirokazu Isokawa" and insert --Hirokazu Isogawa--.

Signed and Sealed this

Third Day of April, 2001

Attest:

NICHOLAS P. GODICI

Attesting Officer

Acting Director of the United States Patent and Trademark Office